United States Patent
Kuo

(10) Patent No.: US 10,337,651 B1
(45) Date of Patent: Jul. 2, 2019

(54) CABLE CLIP

(71) Applicant: GETAC TECHNOLOGY CORPORATION, Hsinchu County (TW)

(72) Inventor: Hsiu-Yu Kuo, Taipei (TW)

(73) Assignee: GETAC TECHNOLGY CORPORATION, Hsinchu County (TW)

( * ) Notice: Subject to any disclaimer, the term of this patent is extended or adjusted under 35 U.S.C. 154(b) by 0 days.

(21) Appl. No.: 16/032,014

(22) Filed: Jul. 10, 2018

(30) Foreign Application Priority Data

Mar. 2, 2018 (CN) .......................... 2018 1 0173237

(51) Int. Cl.
  *F16L 3/10* (2006.01)
(52) U.S. Cl.
  CPC ................................. *F16L 3/1075* (2013.01)
(58) Field of Classification Search
  USPC ....................................................... 248/74.1
  See application file for complete search history.

(56) References Cited

U.S. PATENT DOCUMENTS

| | | | | | |
|---|---|---|---|---|---|
| 3,144,695 | A | * | 8/1964 | Budwig | F16L 3/137 24/16 PB |
| 3,376,004 | A | * | 4/1968 | Goldman | F16L 3/123 24/16 R |
| 4,501,400 | A | * | 2/1985 | Leonardo | H02G 7/053 248/316.1 |
| 4,533,102 | A | * | 8/1985 | Ferrell | F16L 3/123 248/316.1 |
| 5,172,877 | A | * | 12/1992 | Hattori | F16L 3/123 24/535 |
| 2003/0122040 | A1 | * | 7/2003 | Pisczak | G02B 6/483 248/74.1 |
| 2008/0283686 | A1 | * | 11/2008 | Copper | H01R 4/5091 248/74.1 |
| 2009/0261214 | A1 | * | 10/2009 | Beauchamp | G06F 1/181 248/74.1 |
| 2012/0097468 | A1 | * | 4/2012 | Takeda | E02F 9/2275 180/311 |
| 2012/0205499 | A1 | * | 8/2012 | Shelton | F16L 3/1091 248/62 |

\* cited by examiner

*Primary Examiner* — Monica E Millner

(57) ABSTRACT

A cable clip disposed at an electronic device and adapted to clamp a cable is provided. The cable clip comprises a first clamping unit and a second clamping unit. The first clamping unit has a first clamping portion and two spaced-apart anti-pulling portions. The second clamping unit has a second clamping portion corresponding in position to the first clamping portion and two fixing portions corresponding in position to the two anti-pulling portions, to which the two anti-pulling portions are connected respectively. The cable is clamped between the first and second clamping portions when the first and second clamping units fit together in operation, and thus part of the electronic device is confined between the two anti-pulling portions, allowing the first clamping unit to bear a pulling force by one of the two anti-pulling portions. The cable clip prevents detachment of the cable's connector otherwise electrically connected to the electronic device.

7 Claims, 5 Drawing Sheets

CABLE CLIP

CROSS-REFERENCE TO RELATED APPLICATIONS

This application claims priority from China Patent Application No. 201810173237.8, filed on Mar. 2, 2018, the entire disclosure of which is hereby incorporated by reference.

BACKGROUND OF THE INVENTION

Field of the Invention

The present invention relates to cable clips and, more particularly, to a cable clip that prevents data transmission cables or signal transmission cables from being pulled off inadvertently.

Description of the Prior Art

Electronic devices (for example, data processing devices, including tablets and notebooks) transmit data or signals mostly by cables (such as RJ45 cables, HDMI cables, USB cables and the like).

All connectors of conventional cables are pluggable and unpluggable. However, pulling the cables inadvertently often results in detachment of the connectors otherwise electrically connected to the electronic devices, leading to interruptions of data/signal transmission.

Accordingly, it is imperative to provide a cable clip that prevents connectors of cables from being pulled off inadvertently.

SUMMARY OF THE INVENTION

It is an objective of the present invention to provide a cable clip that, as soon as a cable is pulled inadvertently, prevents detachment of the cable's connector otherwise electrically connected to an electronic device, thereby preventing interruptions of data/signal transmission.

In order to achieve the above and other objectives, the present invention provides a cable clip, disposed at an electronic device and adapted to clamp a cable, the cable clip comprising: a first clamping unit having a first clamping portion and two spaced-apart anti-pulling portions; and a second clamping unit having a second clamping portion corresponding in position to the first clamping portion and two fixing portions corresponding in position to the two anti-pulling portions, with the two anti-pulling portions fixedly connected to the two fixing portions, respectively, wherein the cable is clamped between the first clamping portion and the second clamping portion when the first and second clamping units fit together in operation, and thus a point on the electronic device is confined between the two anti-pulling portions, thereby allowing the first clamping unit to bear a pulling force by one of the two anti-pulling portions.

Compared with the prior art, the present invention has advantages as follows: allowing a cable to be fixedly connected to a point on an electronic device, preventing, as soon as the cable is pulled inadvertently, detachment of the cable's connector otherwise electrically connected to an electronic device, thereby preventing interruptions of data/ signal transmission.

DETAILED DESCRIPTION OF THE EMBODIMENTS

Technical features and technical solutions of the present invention are described below with reference to accompanying drawings. However, the accompanying drawings are for reference and illustration only, but are not restrictive of the present invention.

Figure 3:
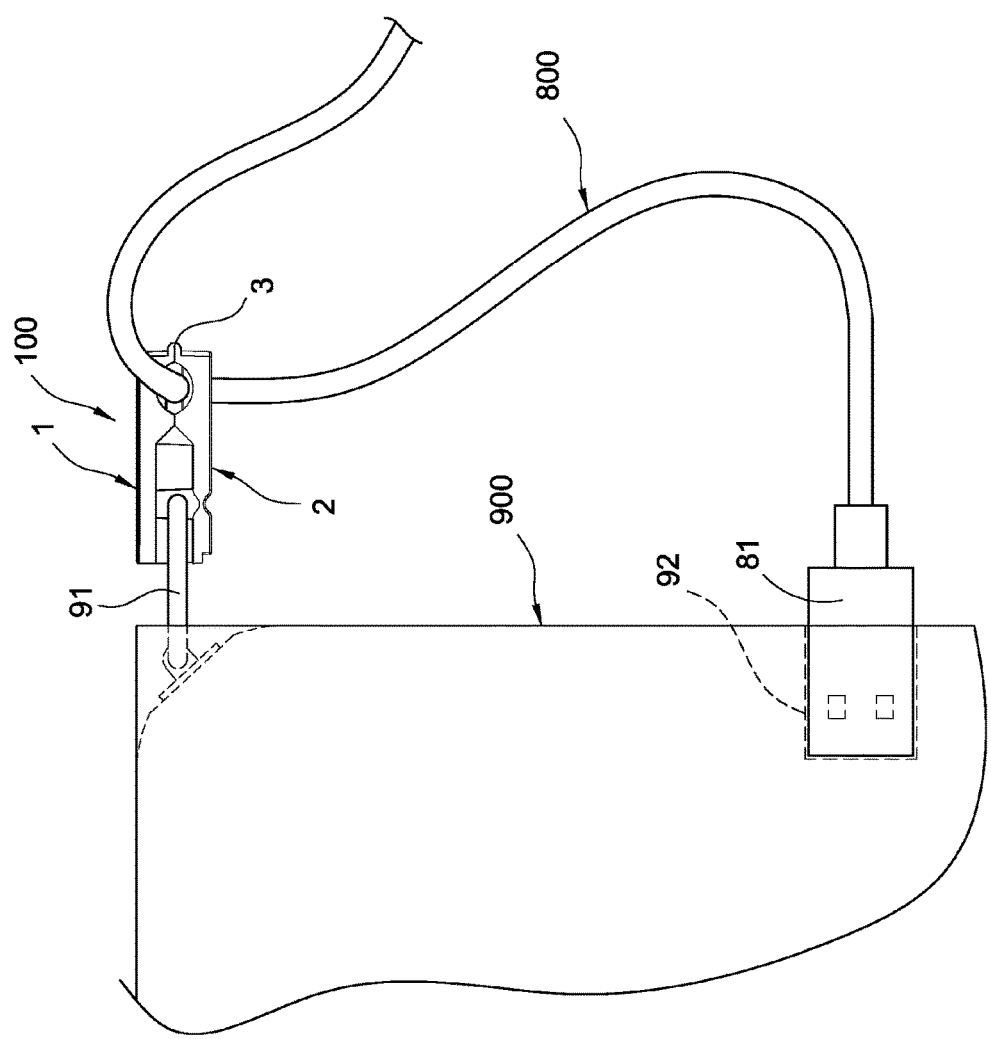
FIG. 3 is a top view of the cable clip for use between an electronic device and a cable.

The present invention provides a cable clip, as shown in FIG. 3, to be used between a cable 800 and an electronic device 900 which the cable 800 connects to, so as to prevent the cable 800 from being pulled off inadvertently and thereby prevent interruptions of data/signal transmission. The electronic device 900 is, for example, a data processing device, such as a tablet or a notebook, whereas the cable 800 is, for example, a transmission cable, such as an RJ45 cable, an HDMI cable or a USB cable, but the present invention is not limited thereto. In this embodiment, the electronic device 900 and the cable 800 are a notebook and a USB cable, respectively, for exemplary purposes. Hence, the cable 800 has a connector 81, whereas the electronic device 900 has an insertion portion 92 which the connector 81 is plugged to and unplugged from.

Referring to FIG. 1 through FIG. 4, a cable clip 100 is disposed at the electronic device 900 and adapted to clamp the cable 800. The cable clip 100 comprises a first clamping unit 1 and a second clamping unit 2 which fit together in operation. The present invention is not restrictive of the connection between the first and second clamping units 1, 2; hence, it is either feasible for the first and second clamping units 1, 2 to be not connected (not shown) or feasible for the cable clip 100 to further comprise a bend element 3 (shown in the diagrams) connected between the first and second clamping units 1, 2. In this embodiment, the cable clip 100 comprises the bend element 3, for exemplary purposes, such that the first clamping unit 1 and the second clamping unit 2 fit together in operation because of the bending of the bend element 3.

The present invention is not restrictive of the bend element 3 and the connection between the first and second clamping units 1, 2. In this embodiment, the first clamping unit 1 has a connecting end 101 and a free end 102, whereas the second clamping unit 2 has a connecting end 201 and a free end 202, with the bend element 3 connected between the connecting ends 101, 201.

The first clamping unit 1 has a first clamping portion 11 and two spaced-apart anti-pulling portions 12. The second clamping unit 2 has a second clamping portion 21 and two spaced-apart fixing portions 22. The second clamping portion 21 corresponds in position to the first clamping portion 11. The two fixing portions 22 correspond in position to the two anti-pulling portions 12, respectively. The two anti-pulling portions 12 are fixedly connected to the two fixing portions 22, respectively.

Figure 4:
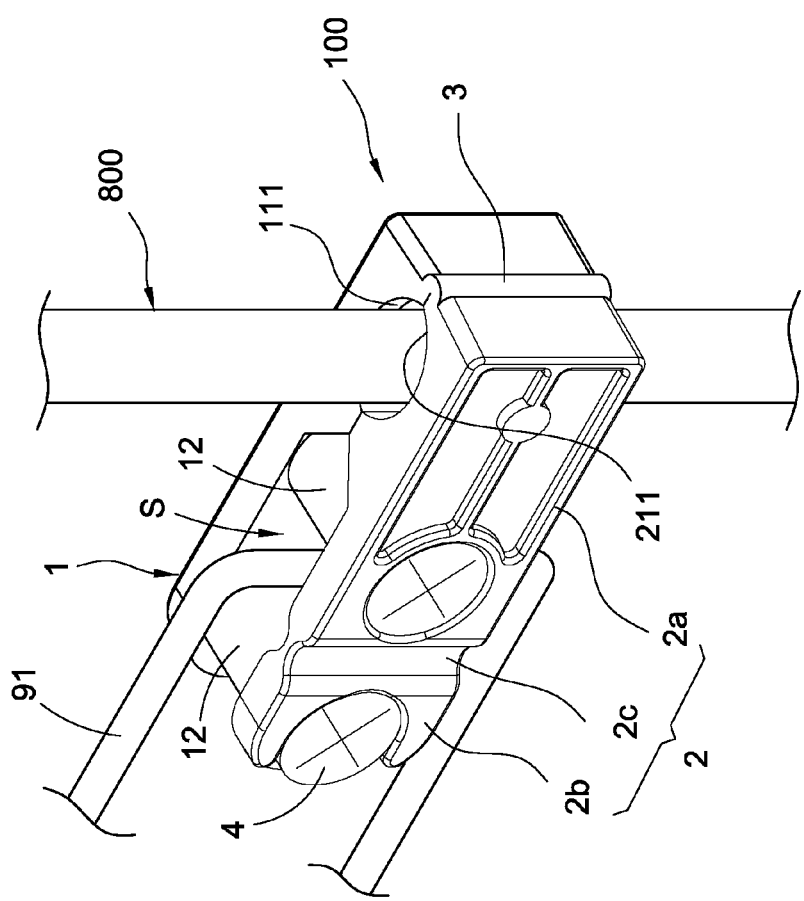
FIG. 4 is a partial, enlarged perspective view of the cable clip of FIG. 3 according to the present invention.
Figure 5:
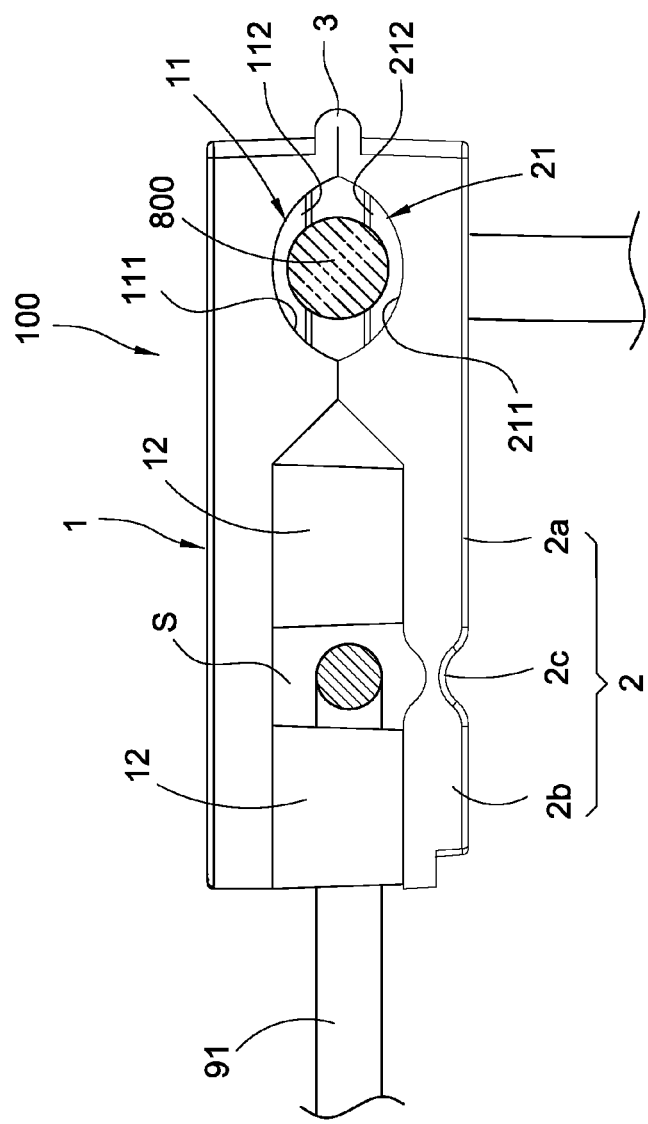
FIG. 5 is a lateral view of the cable clip of FIG. 4 according to the present invention.

Referring to FIG. 3 through FIG. 5, if the first and second clamping units 1, 2 fit together in operation by the bend element 3, the cable 800 will be clamped between the first clamping portion 11 and the second clamping portion 21, and thus a point on the electronic device 900 will be confined between the two anti-pulling portions 12, thereby allowing the first clamping unit 1 to bear a pulling force by one of the two anti-pulling portions 12. Hence, if a user pulls a right segment (not shown in FIG. 3) of the cable 800 inadvertently, the connector 81 connected to a left segment (shown in FIG. 3) of the cable 800 will be prevented from being pulled off the insertion portion 92, because a portion between the left and right segments of the cable 800 is fixedly connected to a ring 91 of the electronic device 900 by the cable clip 100. The aforesaid point on the electronic device 900 is any portion of the electronic device 900 or any object disposed on the electronic device 900, and the cable clip 100 restricts the movement of the portion or object. In this embodiment, as shown in the diagrams, the aforesaid point on the electronic device 900 is the ring 91 of the electronic device 900 for exemplary purposes. The pulling force is a tension which is produced in the right segment (not shown in FIG. 3) of the cable 800, because the user ignores the fact that the cable 800 has one end fixed in place and the other end connected to the electronic device 900 and pulls the right segment of the cable 800 inadvertently while moving the electronic device 900. The tension is transmitted via the cable clip 100, passed the connector 81, and finally exerted on the ring 91 to ensure that the connector 81 will not be affected by the tension or the pulling force when connected to the insertion portion 92.

The first clamping portion 11 and the second clamping portion 21 are positioned proximate to the two connecting ends 101, 201, respectively. The two anti-pulling portions 12 are positioned distal to the connecting end 101 of the first clamping unit 1. The two fixing portions 22 are positioned distal to the connecting end 201 of the second clamping unit 2. Hence, operation of the cable clip 100 is effectuated by clamping the cable 800 and then confining the ring 91 between the two anti-pulling portions 12.

A limiting space S (shown in FIG. 4 and FIG. 5) is formed between the first clamping unit 1, the second clamping unit 2 and the two anti-pulling portions 12. The ring 91 of the electronic device 900 is contained and confined to the limiting space S.

The first clamping portion 11 comprises a first slot 111 disposed at the first clamping unit 1 and at least two first ribs 112 corresponding in position to the first slot 111. The second clamping portion 21 comprises a second slot 211 disposed at the second clamping unit 2 and at least a second rib 212 corresponding in position to the second slot 211. The second slot 211 is opposite the first slot 111. The second rib 212 is spaced apart from the first ribs 112 such that the cable 800 is clamped between the second rib 212 and the first ribs 112 (shown in FIG. 5). The present invention is not restrictive of the number of the first ribs 112 and the number of the second rib 212; hence, in this embodiment, the cable clip 100 of the present invention will work, provided that the cable 800 is firmly clamped and positioned in place. In a variant embodiment not shown, the first rib 112 is in the number of at least one, whereas the second rib 212 is in the number of at least two.

Figure 1:
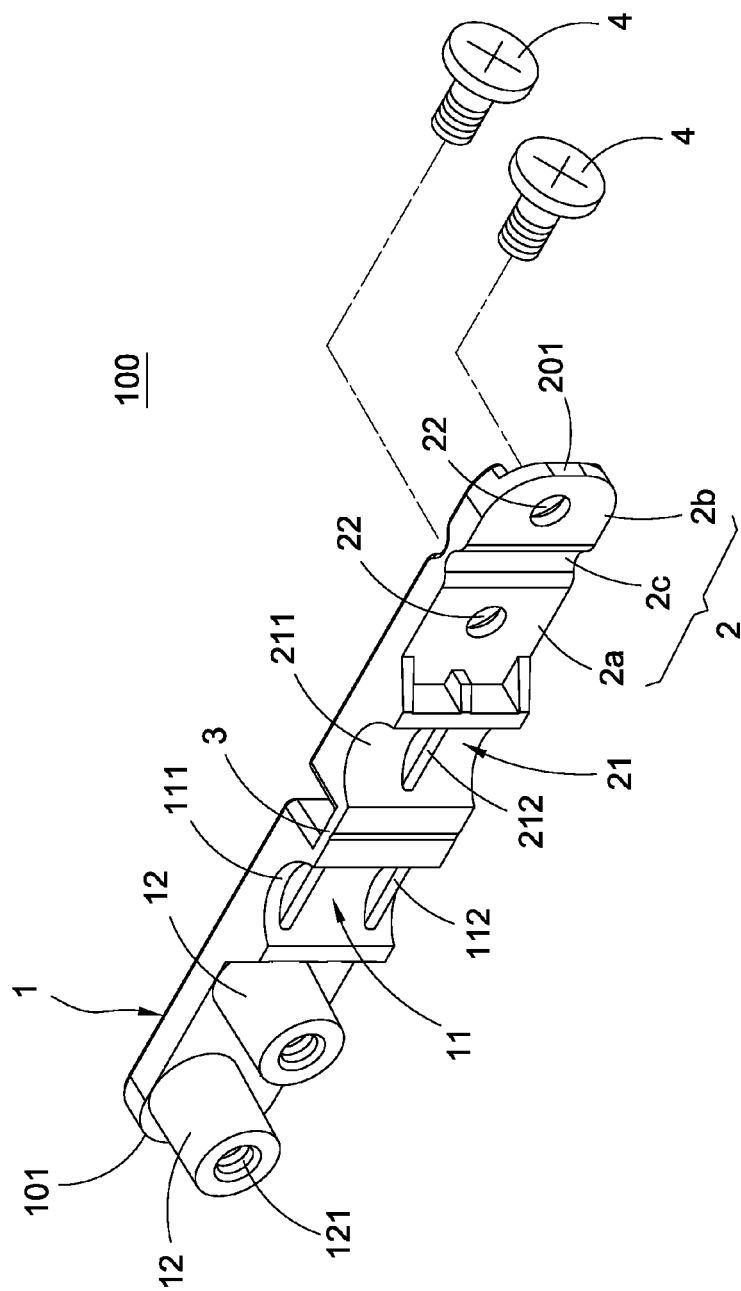
FIG. 1 is a perspective view of a cable clip according to an embodiment of the present invention.
Figure 2:
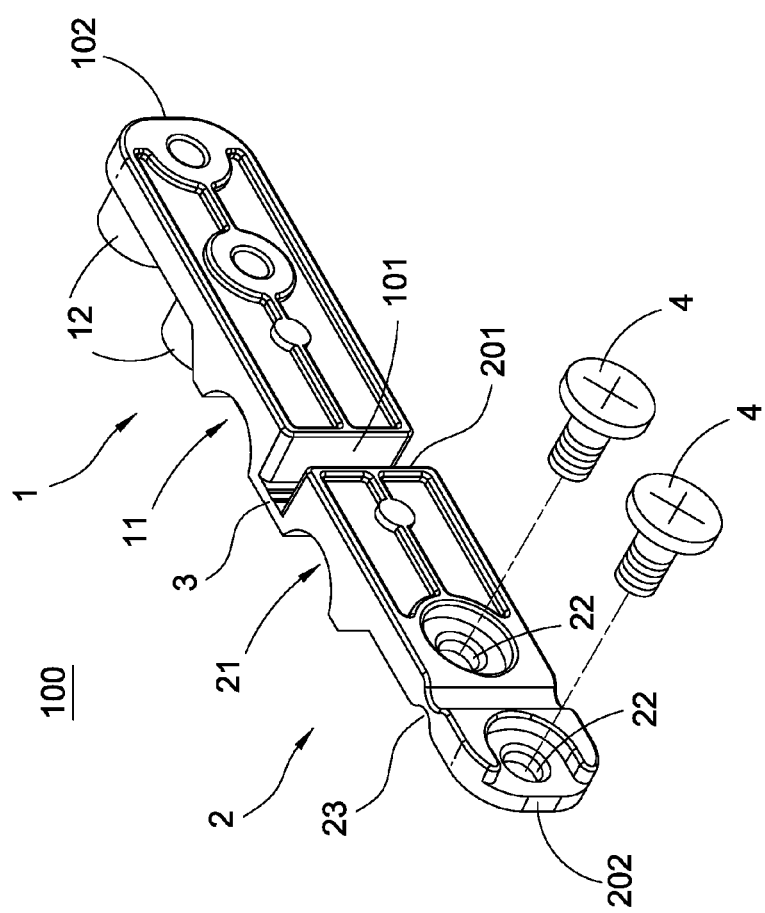
FIG. 2 is a perspective view of the cable clip from another angle, i.e., when rotated by 90° relative to the viewing angle of FIG. 1.

The two anti-pulling portions 12 are of any structure capable of bearing a pulling force. In this embodiment, the two anti-pulling portions 12 are two tensile poles disposed on the first clamping unit 1, for exemplary purposes. The two fixing portions 22 are of any structure which enables the two fixing portions 22 to be fixedly connected to the two anti-pulling portions 12, respectively. In this embodiment, the two fixing portions 22 are two holes disposed at the second clamping unit 2, for exemplary purposes. Therefore, the two fixing elements 4 are each fixedly connected between a corresponding one of the two tensile poles and a corresponding one of the two holes. The fixing elements 4 are screwing components. The tensile poles each have a screw hole 121; hence, the screwing components are screwed to the screw holes 121 of the tensile poles through the holes and thus fixed in place. In this embodiment, as illustrated by FIG. 1, except for the fixing elements 4, the cable clip 100 is made of PA (Polyamide) 66, a Nylon engineering plastic, and integrally formed by injection molding. The anti-pulling portions 12 are poles with internal threads.

Preferably, as shown in FIG. 1 and FIG. 5, the second clamping unit 2 further comprises a first segment 2a, a second segment 2b, and a bend portion 2c connected between the first segment 2a and the second segment 2b. The bend portion 2c is a groove 23 (shown in FIG. 2) disposed on at least a surface of the second clamping unit 2. The second segment 2b bends (not shown) about the bend portion 2c relative to the first segment 2a. The first segment 2a has the second clamping portion 21. The two fixing portions 22 flank the bend portion 2c and thus are disposed at the first segment 2a and the second segment 2b, respectively. Hence, one of the fixing elements 4 is fixedly connected to a corresponding one of the anti-pulling portions 12 through the fixing portion 22 disposed at the first segment 2a such that the cable 800 is clamped between the first and second clamping portions 11, 21 and thereby fixed in place. Afterward, the second segment 2b is bent relative to the first segment 2a and thus lifted such that the ring 91 is placed between the two anti-pulling portions 12. Then, the second segment 2b is bent relative to the first segment 2a and thus shut. Finally, the other fixing element 4 is fixedly connected to the other anti-pulling portion 12 through the fixing portion 22 disposed at the second segment 2b; hence, the ring 91 is confined between the two anti-pulling portions 12 and thereby fixed in place.

In conclusion, compared with the prior art, the present invention has an advantage described below. The cable 800 is fixedly connected to a point (such as the ring 91) on the electronic device 900. Hence, even if the cable 800 is pulled inadvertently, the connection between the cable clip 100 and the electronic device 900, rather than the connection between the connector 81 and the insertion portion 92, will be pulled, because the burden of bearing the pulling force will have already shifted from the connector 81 to one of the two anti-pulling portions 12. Therefore, the cable clip 100 of the present invention prevents detachment of the connector 81 otherwise electrically connected to the electronic device 900, thereby preventing interruptions of data/signal transmission.

The present invention has another advantage described below. Owing to the second clamping unit 2, two anti-pulling portions 12 and two fixing portions 22, which are bendable and multi-segment, the cable clip 100 is characterized in that: the cable 800 is clamped between the first and second clamping portions 11, 21 and thereby fixed in place, and then the ring 91 is confined between the two anti-pulling portions 12 and thereby fixed in place, allowing the user to effectuate connection easily without the hassles of clamping the cable 800 and fixing the ring 91 in place simultaneously.

Although the present invention is disclosed above by a preferred embodiment, the preferred embodiment is not restrictive of the claims of the present invention. All equivalent structural changes made to the preferred embodiment according to the specification and drawings of the present invention must be deemed falling within the scope of the claims of the present invention.

What is claimed is:

1. A cable clip, disposed at an electronic device and adapted to clamp a cable, the cable clip comprising:
   a first clamping unit having a first clamping portion and two spaced-apart anti-pulling portions;
   a second clamping unit having a second clamping portion corresponding in position to the first clamping portion and two fixing portions corresponding in position to the two anti-pulling portions, with the two anti-pulling portions fixedly connected to the two fixing portions, respectively; and
   a bend element connected between the first clamping unit and the second clamping unit such that the first clamping unit and the second clamping unit fit together in operation;
   wherein, when the first and second clamping units are fit together in operation, the cable is clamped between the first clamping portion and the second clamping portion, and a point on the electronic device is confined between the two anti-pulling portions, thereby causing the first clamping unit and the electronic device to bear a pulling force on the cable via one of the two anti-pulling portions;
   wherein the first clamping unit and the second clamping unit each have a connecting end, the bend element is connected between the two connecting ends with the first and second clamping portions positioned proximate to the two connecting ends, respectively, the two anti-pulling portions being positioned distal to the connecting end of the first clamping unit, and the two fixing portions being positioned distal to the connecting end of the second clamping unit;
   wherein the second clamping unit comprises a first segment, a second segment, and a bend portion connected between the first segment and the second segment, the second segment being capable of bending about the bend portion relative to the first segment, the first segment having the second clamping portion, such that the two fixing portions flank the bend portion and are disposed at the first segment and the second segment, respectively.

2. The cable clip of claim 1, wherein the first clamping portion comprises a first slot disposed at the first clamping unit and at least two first ribs corresponding in position to the first slot, the second clamping portion comprises a second slot disposed at the second clamping unit and opposite to the first slot and at least a second rib corresponding in position to the second slot, and the at least a second rib is spaced apart from the at least two first ribs, such that when the first and second clamping units are fit together in operation, the cable is clamped between the at least a second rib and the at least two first ribs.

3. The cable clip of claim 1, wherein a limiting space is formed between the first clamping unit, the second clamping unit and the two anti-pulling portions to contain a point on the electronic device.

4. The cable clip of claim 1, wherein the bend portion is a groove disposed on at least a surface of the second clamping unit.

5. The cable clip of claim 1, wherein the two anti-pulling portions are two tensile poles disposed at the first clamping unit, respectively.

6. The cable clip of claim 5, wherein the two fixing portions are two holes disposed at the second clamping unit, respectively, with the two holes fixedly connected to the two tensile poles by two fixing elements, respectively.

7. The cable clip of claim 6, wherein the two fixing elements are two screwing components, respectively, and the two tensile poles each have a screw hole, allowing the screwing components to be screwed to the screw holes of the tensile poles through the holes, respectively.

* * * * *